United States Patent
Yu et al.

(10) Patent No.: US 11,574,464 B2
(45) Date of Patent: Feb. 7, 2023

(54) PRACTICAL METHOD FOR LANDSLIDE DETECTION IN LARGE SPACE

(71) Applicant: Aerospace Information Research Institute, Chinese Academy of Sciences, Beijing (CN)

(72) Inventors: Bo Yu, Beijing (CN); Fang Chen, Beijing (CN)

(73) Assignee: AEROSPACE INFORMATION RESEARCH INSTITUTE, CHINESE ACADEMY OF SCIENCES, Beijing (CN)

( * ) Notice: Subject to any disclaimer, the term of this patent is extended or adjusted under 35 U.S.C. 154(b) by 119 days.

(21) Appl. No.: 17/070,702

(22) Filed: Oct. 14, 2020

(65) Prior Publication Data

US 2022/0012460 A1   Jan. 13, 2022

(30) Foreign Application Priority Data

Jul. 7, 2020 (CN) .......................... 202010646183.X

(51) Int. Cl.
*G06K 9/62* (2022.01)
*G06V 20/13* (2022.01)
(Continued)

(52) U.S. Cl.
CPC ........... *G06V 20/13* (2022.01); *G06K 9/6262* (2013.01); *G06V 10/34* (2022.01); *G06V 10/56* (2022.01); *G06V 10/60* (2022.01)

(58) Field of Classification Search
CPC ...... G06V 20/13; G06V 20/194; G06V 10/34; G06V 10/56; G06V 10/60; G06V 10/58; G06V 10/77; G06K 9/6262; G06N 20/10
See application file for complete search history.

(56) References Cited

FOREIGN PATENT DOCUMENTS

CN   105469058 A  *  4/2016
CN   109767409 A  *  5/2019

OTHER PUBLICATIONS

Robson et al, Automated classification of debris-covered glaciers combining optical, SAR and topographic data in an object-based environment, Oct. 22, 2015, Remote Sensing of Environment, 170: 372-387. (Year: 2015).*

(Continued)

*Primary Examiner* — Matthew C Bella
*Assistant Examiner* — Kathleen M Broughton
(74) *Attorney, Agent, or Firm* — WPAT, PC

(57) ABSTRACT

This invention discloses a practical method for landslide detection in large space, which comprises the following steps: image synthesis, ice and snow detection, removal of non-potential landslide area, detection of potential landslide area, feature calculation, landslide detection model construction and precision validation; this invention avoids radiometric correction and outlier by detecting landslide from synthetic image. That guarantees practical applicability of the proposal. Firstly, detecting potential landslides can avoid the imbalanced sample distribution issue between background objects and landslides when training the landslide detection model. The landslide is further detected by building a random forest model based on the spectral features and textural features of potential landslide pixels in different neighboring time domains. It fully considers the changes of objects in different time domains, and lays a foundation for efficient landslide extraction. This model is relatively reliable and practical for automatically detecting landslide from large-scale images.

3 Claims, 3 Drawing Sheets

(51) Int. Cl.
  *G06V 10/56* (2022.01)
  *G06V 10/60* (2022.01)
  *G06V 10/34* (2022.01)

(56) References Cited

OTHER PUBLICATIONS

Deijns et al, Semi-automated detection of landslide timing using harmonic modelling of satellite imagery, Buckinghorse River, Canada, Aug. 29, 2019, Int J Appl Earth Obs Geoinformation, 2020; 101943 (Year: 2019).*

Tsuchida et al, Detection of Landslides in the 2015 Gorkha, Nepal Earthquake using Satellite Imagery, Oct. 2015, Researchgate for 36th Asian Conference on Remote Sensing, 2015. (Year: 2015).*

* cited by examiner

PRACTICAL METHOD FOR LANDSLIDE DETECTION IN LARGE SPACE

FIELD OF THE INVENTION

This invention relates to the technical fields of remote sensing image processing and machine learning, in particular to a practical method for landslide detection in large space.

BACKGROUND OF THE INVENTION

At present, the methods of remote sensing landslide detection are different according to different data types. The landslide detection methods based on optical image synthesize spectral, textural, shape and morphological features, and are generally grouped to two categories: (1) Pixel based detection; (2) Object oriented detection. Pixel based detection takes each pixel as the object of interest, calculates statistics on the spectral and textural features of each pixel in the image, and detects landslide by setting threshold. However, this method only takes into account the features of a single pixel, and lacks the spatial characteristics of the object that the pixel belongs to. Therefore, the characteristics of pixels among an object lack necessary correlation. Object oriented detection takes an object as the calculation target. It combines the adjacent pixels with similar features by region growth rules and detects landslide based on the spectral and textural features of each generated object. Such detection method heavily relies on the segmentation of each object obtained after region growing. Once the generated object regions contain many background object pixels, or miss many target object pixels, the subsequent detection precision will be directly affected.

Both methods mentioned above involve threshold setting. At present, three strategies have been developed to set threshold: in the first strategy, the threshold is set manually, which is time-consuming and labor-consuming, and the rules constructed are often not robust. Therefore, it is difficult to detect multiple landslide events from a large-scale remote sensing image. The second strategy learns threshold automatically by machine learning model, built from multi-dimensional features for each training sample, including spectral, textural and geometric features. The machine learning model can simulate the threshold by learning the manually designed features to detect landslides. However, most machine learning algorithms have a requirement of balanced sample distribution, that the sample size of different types of ground objects should be equivalent. However, due to the disaster attribute of landslides, the number of landslide samples is much smaller than that of background objects, especially in a large space. Therefore, landslide detection from remote sensed images is mostly based on a small number (from a few events to dozens of events) of small-scale landslides, and the spectral or textural differences between landslides and background objects are obvious in the image. The third strategy, deep learning, has been widely used in object detection, recognition, segmentation and other tasks in computer vision field. It can learn local and global features automatically and directly from training samples, without feature engineering. However, method based on deep learning needs a large number of training samples, and the parameter tuning process of the model is complicated, thus making it difficult to apply in practical applications. Therefore, this invention proposes a practical method for landslide detection in large space to solve the problems in the prior art.

SUMMARY OF THE INVENTION

In view of the above problems, the purpose of this invention is to propose a practical method for landslide extraction in large space. This practical method for landslide detection in large space is to detect the change of the annual Landsat 8 images in 2015-2018 synthesized from the Google Earth engine. Firstly, detect potential landslide, and calculate its spectral and textural features based on potential landslide pixels to build a random forest model for landslide detection so as to improve the precision of landslide detection and the practicability of the model.

To achieve the purpose of this invention, this invention is implemented by the following technical proposal: a practical method for landslide detection in large space, characterized that it comprises the following steps:

Step 1: Image synthesis

Generate annual synthesis on the Landsat 8 images of the whole territory of region A from 2015 to 2018 respectively based on the Google Earth engine by using the 50% maximum NDVI strategy to generate the annual synthetic images, select the blue band, green band, red band, near-infrared band, short wave near-infrared band 1 and short wave near-infrared band 2 of the Landsat 8 images and label them as b1, b2, b3, b4, b5 and b6, respectively;

Step 2: Ice and snow detection

Detect ice and snow from the blue band image based on the annual synthetic Landsat 8 images by thresholding method, that is, regarding pixels with reflectance greater than 0.2 as ice and snow;

Step 3: Removal of non-potential landslide area

Calculate slope based on the STRM DEM digital elevation data of the research area, determine the regions with slope greater than 71° and less than 10° as non-potential landslide areas, and remove the non-potential landslide areas;

Step 4: Detection of potential landslide area

Calculate the Normalized Difference Water Index (NDWI) according to formula (1) respectively based on the annual synthetic Landsat 8 images of adjacent years, determine potential landslide area according to formulae (2)-(8), and normalize it to an integer range of 0-255 to obtain the detection result of the potential landslide area;

Step 5: Feature calculation

Calculate the spectral features and textural features of each potential landslide pixel based on the potential landslide detection result obtained in Step 4, including the reflectances of the six bands in the Tth year image and the (T+1)th year image specifically, and calculate the Normalized Difference Vegetation index (NDVI) and two other improved versions, namely NDVI_m1 and NDVI_m2, the Normalized Burn Ratio (NBR), the Normalized Difference Moisture Index (NDMI), the Normalized Difference Snow Index (NDSI) and the Normalized Difference Water Index (NDWI) of the two adjacent years according to formulae (9)-(15);

In addition, conduct principal component analysis on the near-infrared band and blue band of adjacent temporal synthetic images, and take the principal component image as a feature of landslide detection, and at the same time, calculate the reflectance differences and index differences of each pixel in b1-b6 of synthetic images in the Tth year and the (T+1)th year as well as the average reflectance and variance of each pixel with its surrounding 5×5 neighborhood pixels in the potential landslide detection result image, and take them as features for exact landslide detection;

Step 6: Build landslide detection model

Build exact landslide detection model based on the features above and the potential landslide detection area as well as the ground truth landslide pixels obtained by visual interpretation from the annual synthetic images of 2016-2018;

Step 7: Precision validation

Detect landslide from potential landslide detection area of the annual synthetic image in 2015 based on the built model, and calculate the omission error and commission error based on the corresponding ground truth landslide image from visual interpretation.

A further improvement is: in the described Step 1, the specific strategy of image synthesis is as follows: (1) Collect all the Landsat 8 images covering the whole territory of region A of year y (y=2015, 2016, 2017, 2018) respectively; (2) Calculate the NDVI values of each pixel in all the Landsat 8 images of year y (y=2015, 2016, 2017, 2018) in the research area before sorting them, and take the spectral information in each band of the pixel whose reflectance ranks 50% of the maximum NDVI as that of the synthetic image; (3) Select blue band, green band, red band, near-infrared band, short wave near-infrared band 1 and short wave near-infrared band 2 of the Landsat 8 images from the band information of each annual synthetic image, and label them as b1, b2, b3, b4, b5 and b6, respectively.

A further improvement is: in the described Step 4, the specific formulae are as follows:

$$NDWI = b2/b4 \quad (1)$$

$$NDWI(b1 <= 0.03) = 0 \quad (2)$$

$$NDWI((b4-b3) > 0.2) = 0 \quad (3)$$

$$NDWI(b2 <= 0.04) = 0 \quad (4)$$

$$NDWI(NDWI < 0.4) = 0 \quad (5)$$

$$NDWI\_DIFF = NDWI_{y+1} - NDWI_y \quad (6)$$

$$NDWI\_DIFF(NDWI\_DIFF <= 0.1) = 0 \quad (7)$$

$$POTENTIAL\_LANDSLIDE = BYTSCL(NDWI\_DIFF) \quad (8)$$

Wherein BYTSCL normalizes the pixel value of NDWI_DIFF image to 0-255, y represents a certain year, and y+1 represents the next year.

A further improvement is: in the described Step 5, the specific formulae are as follows:

$$NDVI = (b4-b3)/(b4+b3) \quad (9)$$

$$NDVI\_m1 = 2.5 \times (b4-b3)/(b4+6 \times b3 - 7.5 \times b1 + 1.0) \quad (10)$$

$$NDVI\_m2 = (b4-b3)/(b4+b3+0.5) \times 1.5 \quad (11)$$

$$NBR = (b4-b6)/(b4+b6) \quad (12)$$

$$NDMI = (b4-b5)/(b4+b5) \quad (13)$$

$$NDSI = (b2-b5)/(b2+b5) \quad (14)$$

$$NDWI = (b2-b3)/(b2+b3) \quad (15)$$

Wherein b4 is the near-infrared band, b3 is the red band, b2 is the green band, b1 is the blue band, b5 is the short wave near-infrared band with the wavelength range of 1.57-1.65 ($\mu m$), and b6 is also the short wave near-infrared band with the wavelength range of 2.11-2.29 ($\mu m$).

A further improvement is: in the described Step 6, the specific steps for building the model are as follows: (1) Select 5000 landslide sample pixels randomly based on visually interpreted landslide result of the annual synthetic images of 2016-2018, and select 50000 non-landslide sample pixels randomly from the potential landslide area detected from the annual synthetic images of 2016-2018; (2) Calculate features of the randomly selected sample pixels; (3) Build the landslide detection model based on the random forest structure, in which the number of trees is 500 and the dimension of the randomly selected features of each decision tree node is 31.

A further improvement is: in the described Step 7, the omission error refers to the percentage of the ground truth landslide pixels which are classified as background object pixels, and the commission error refers to the percentage of classified landslide pixels that are ought to be classified as background objects.

The beneficial effects of this invention are as follows: this invention avoids radiometric correction and outlier by detecting landslide from synthetic images. That guarantees practical applicability of the proposal. Firstly, detecting potential landslides can avoid the imbalanced sample distribution issue between background objects and landslides when training the landslide detection model. The landslide is further detected by building a random forest model based on the spectral features and textural features of potential landslide pixels in different neighboring time domains. It fully considers the changes of objects in different time domains, and lays a foundation for efficient landslide extraction. This model is relatively reliable and practical for automatically detecting landslide from large-scale images.

DETAILED DESCRIPTION OF THE INVENTION

In order to deepen the understanding of this invention, this invention will be further elaborated based on an embodiment. This embodiment is only used to explain this invention and does not forma limitation on the protection scope of this invention.

As shown in FIGS. 1, 2, 3 and 4, this embodiment provides a practical method for landslide detection in large space, which comprises the following steps:

Step 1: Image synthesis

Generate annual synthesis on the Landsat 8 images of the whole territory of region A (Nepal) from 2015 to 2018 respectively based on the Google Earth engine by using the 50% maximum NDVI strategy to generate the annual synthetic images. The specific strategy of image synthesis is as follows:

(1) Collect all the Landsat 8 images covering the whole territory of region A (Nepal) of the year y (y=2015, 2016, 2017, 2018) respectively;

(2) Calculate the NDVI values of each pixel in all the Landsat 8 images of year y (y=2015, 2016, 2017, 2018) in the research area before sorting them, and take the spectral information in each band of the pixel whose reflectance ranks 50% of the maximum NDVI as that of the synthetic image;

(3) Select blue band, green band, red band, near-infrared band, short wave near-infrared band 1 and short wave near-infrared band 2 of the Landsat 8 images from the band information of each annual synthetic image, and label them as b1, b2, b3, b4, b5 and b6, respectively.

Step 2: Ice and snow detection

Figure 1:
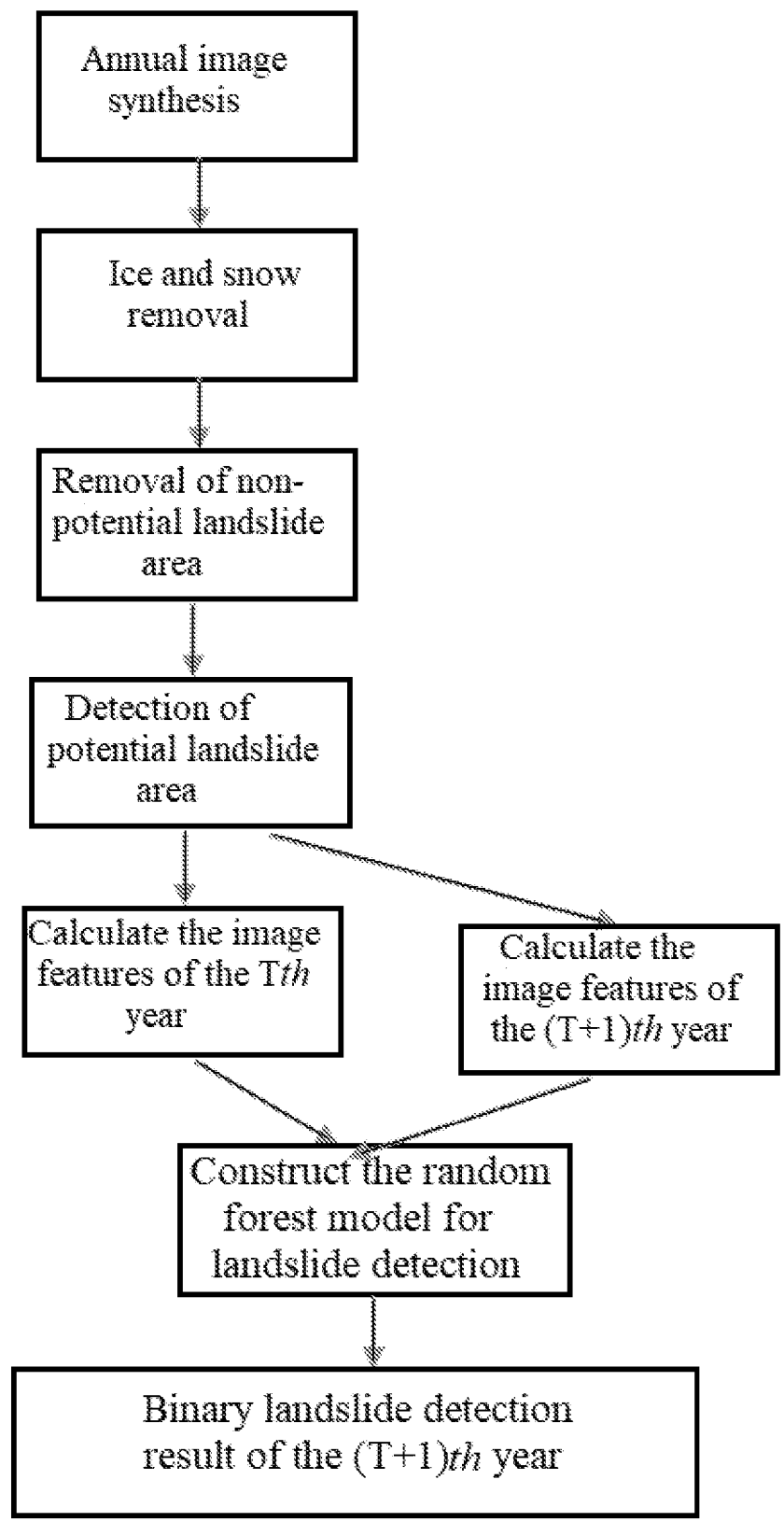
FIG. 1 is the flow chart of landslide detection of this invention.
Figure 2:
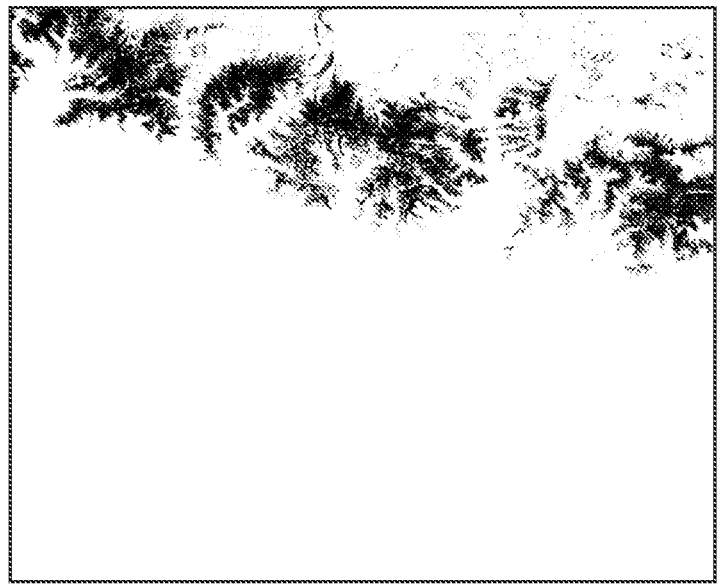
FIG. 2 is the detection result image of ice and snow in Nepal in 2015 generated through this invention.

Detect ice and snow from the blue band image based on the annual synthetic Landsat 8 images by thresholding method, that is, regarding pixels with reflectance greater than 0.2 as ice and snow, as shown in FIG. 2;

Step 3: Removal of non-potential landslide area

Calculate slope based on the STRM DEM digital elevation data of the research area, determine the regions with slope greater than 71° and less than 10° as non-potential landslide areas, and remove the non-potential landslide areas;

Step 4: Detection of potential landslide area

Figure 3:
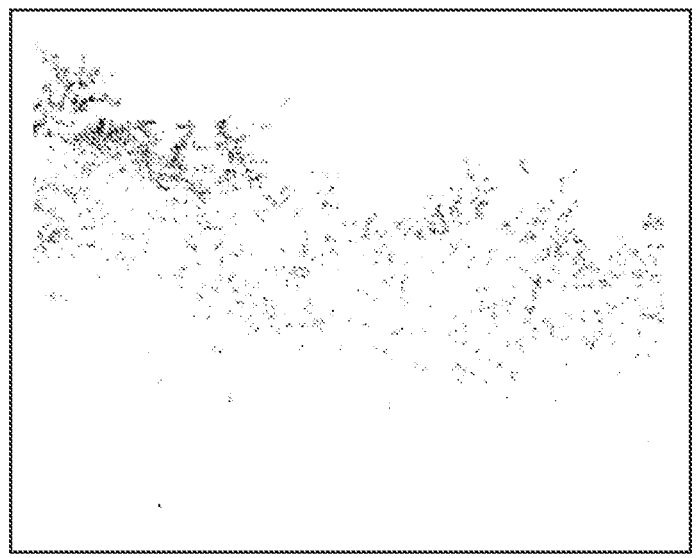
FIG. 3 is the detected potential landslide image of Nepal in 2015 generated by this invention.

Calculate the Normalized Difference Water Index (NDWI) according to formula (1) respectively based on the annual synthetic Landsat 8 images of adjacent years, determine potential landslide area according to formulae (2)-(8), and normalize it to an integer range of 0-255 to obtain the detection result of the potential landslide area, as shown in FIG. 3. The specific formulae are as follows:

$$NDWI = b2/b4 \tag{1}$$

$$NDWI(b1 <= 0.03) = 0 \tag{2}$$

$$NDWI((b4-b3) > 0.2) = 0 \tag{3}$$

$$NDWI(b2 <= 0.04) = 0 \tag{4}$$

$$NDWI(NDWI < 0.4) = 0 \tag{5}$$

$$NDWI\_DIFF = NDWI_{y+1} - NDWI_y \tag{6}$$

$$NDWI\_DIFF(NDWI\_DIFF <= 0.1) = 0 \tag{7}$$

$$POTENTIAL\_LANDSLIDE = BYTSCL(NDWI\_DIFF) \tag{8}$$

Wherein BYTSCL normalizes the pixel value of NDWI_DIFF image to 0-255, y represents a certain year, and y+1 represents the next year;

Step 5: Feature calculation

Calculate the spectral features and textural features of each potential landslide pixel based on the potential landslide detection result obtained in Step 4, including the reflectances of the six bands in the Tth year image and the (T+1)th year image specifically, and calculate the Normalized Difference Vegetation index (NDVI) and other two improved versions, namely NDVI_m1 and NDVI_m2, the Normalized Burn Ratio (NBR), the Normalized Difference Moisture Index (NDMI), the Normalized Difference Snow Index (NDSI) and the Normalized Difference Water Index (NDWI) of the two adjacent years according to formulae (9)-(15). The specific formulae are as follows:

$$NDVI = (b4-b3)/(b4+b3) \tag{9}$$

$$NDVI\_m1 = 2.5 \times (b4-b3)/(b4+6 \times b3 - 7.5 \times b1 + 1.0) \tag{10}$$

$$NDVI\_m2 = (b4-b3)/(b4+b3+0.5) \times 1.5 \tag{11}$$

$$NBR = (b4-b6)/(b4+b6) \tag{12}$$

$$NDMI = (b4-b5)/(b4+b5) \tag{13}$$

$$NDSI = (b2-b5)/(b2+b5) \tag{14}$$

$$NDWI = (b2-b3)/(b2+b3) \tag{15}$$

Wherein b4 is the near-infrared band, b3 is the red band, b2 is the green band, b1 is the blue band, b5 is the short wave near-infrared band with the wavelength range of 1.57-1.65 (μm), and b6 is also the short wave near-infrared band with the wavelength range of 2.11-2.29 (μm);

In addition, conduct principal component analysis on the near-infrared band and blue band of adjacent temporal synthetic images, and take the principal component image as a feature of landslide detection, and at the same time, calculate the reflectance differences and index differences of each pixel in b1-b6 of synthetic images of the Tth year and the (T+1)th year as well as the average reflectance and variance of each pixel with its surrounding 5×5 neighborhood pixels in the potential landslide detection result image, and take them as features for exact landslide detection;

Step 6: Build landslide detection model

Build exact landslide detection model based on the features above and the potential landslide detection area as well as the ground truth landslide pixels obtained by visual interpretation from the annual synthetic images of 2016-2018. The specific steps for constructing the model are as follows:

(1) Select 5000 landslide sample pixels randomly based on visually interpreted landslide result of the annual synthetic images of 2016-2018, and select 50000 non-landslide sample pixels randomly from the potential landslide area detected from the annual synthetic images of 2016-2018;

(2) Calculate features of the randomly selected sample pixels;

(3) Build the landslide detection model based on the random forest structure, in which the number of trees is 500 and the dimension of the randomly selected features of each decision tree node is 31;

Step 7: Precision validation

Figure 4:
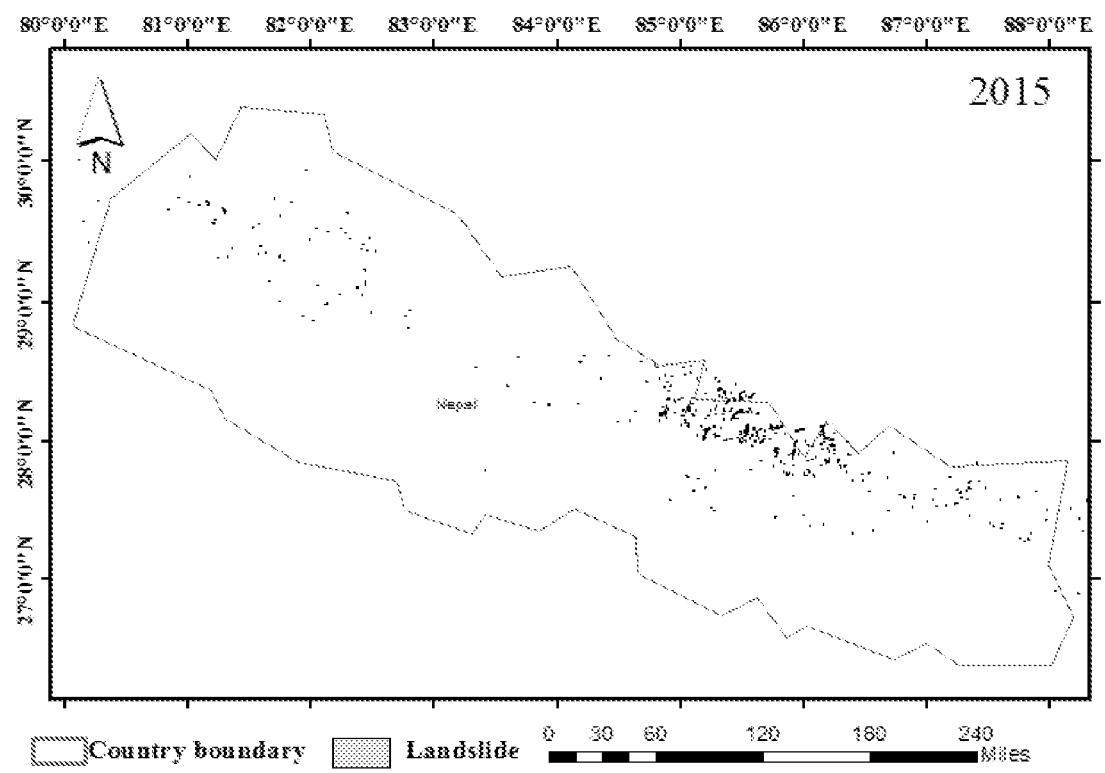
FIG. 4 is the landslide detection result image of Nepal in 2015 generated through this invention.

Detect landslide from potential landslide detection area of the annual synthetic image in 2015 based on the built model, as shown in FIG. 4. Calculate the omission error and commission error based on the corresponding ground truth landslide image from visual interpretation (as shown in Table 1). The omission error refers to the percentage of the ground truth landslide pixels which are classified as background object pixels, and the commission error refers to the percentage of classified landslide pixels that are ought to be classified as background objects.

TABLE 1

Evaluation of landslide detection precision

| | Commission (%) | Omission (%) |
|---|---|---|
| Landslide | 33.85 | 0 |
| Background objects | 0 | 0.04 |

This practical method for landslide detection in large space avoids radiometric correction and outlier by detecting landslide from synthetic image. That guarantees practical applicability of the proposal. Firstly, detecting potential landslides can avoid the imbalanced sample distribution issue between background objects and landslides when training the landslide detection model. The landslide is further detected by building a random forest model based on the spectral features and textural features of potential landslide pixels in different neighboring time domains. It fully considers the changes of objects in different time domains, and lays a foundation for efficient landslide extraction. This model is relatively reliable and practical for automatically detecting landslide from large-scale images.

The above description shows and describes the basic principle, main features and advantages of this invention. Those skilled in the industry should understand that this invention is not limited by the above embodiment. The embodiment and instructions above only describe the principle of this invention. Without deviating from the spirit and scope of this invention, this invention will be flexibly modified and improved, all of which will fall into the protection scope of this invention. The protection scope claimed by this invention is defined by the attached claims and their equivalents.

The invention claimed is:

1. A practical method for landslide detection in large space, comprising:

perform annual synthesis on images of the whole territory of a region A from the year 2015 to the year 2018 respectively by using 50% maximum Normalized Difference Vegetation index (NDVI) strategy to generate an annual synthetic image of each of years from the year 2015 to the year 2018, obtain a blue band, a green band, a red band, a near-infrared band, a first short wave near-infrared band, and a second short wave near-infrared band of the annual synthetic images and label reflectance corresponding to the blue band, the green band, the red band, the near-infrared band, the first short wave near-infrared band, and the second short wave near-infrared band as b1, b2, b3, b4, b5 and b6, respectively;

detect ice and snow from an image corresponding to the blue band based on the annual synthetic images by a thresholding method, that is, regarding pixels with the reflectance greater than 0.2 as ice and snow;

calculate slopes of a research area based on a digital elevation data of the research area, determine the regions with slopes greater than 71° and less than 10° of the research area as non-potential landslide areas, and remove the non-potential landslide areas;

calculate a Normalized Difference Water Index (NDWI) according to formula (1) based on the annual synthetic images of two adjacent years of the year 2015 to the year 2018, determine a pixel value of NDWI_DIFF image according to formulae (2)-(8), and normalize the pixel value to an integer range of 0-255 to obtain a detection result of the potential landslide area;

wherein the formulae (1) to (8) are as follows:

$$NDWI = b2/b4 \tag{1}$$

$$NDWI(b1 <= 0.03) = 0 \tag{2}$$

$$NDWI((b4-b3) > 0.2) = 0 \tag{3}$$

$$NDWI(b2 <= 0.04) = 0 \tag{4}$$

$$NDWI(NDWI < 0.4) = 0 \tag{5}$$

$$NDWI\_DIFF = NDWI_{y+1} - NDWI_y \tag{6}$$

$$NDWI\_DIFF(NDWI\_DIFF <= 0.1) = 0 \tag{7}$$

$$POTENTIAL\_LANDSLIDE = BYTSCL(NDWI\_DIFF) \tag{8}$$

wherein BYTSCL indicates normalizing of the pixel value of NDWI_DIFF image to 0-255, y represents one of years from the year 2015 to the year 2017, and y+1 represents a year next to the one year;

calculate spectral features and textural features of each potential landslide pixel based on the detection result, the spectral features comprises the reflectances corresponding to the blue band, the green band, the red band, the near-infrared band, the first short wave near-infrared band, and the second short wave near-infrared band in the year y and the year y+1, and calculate a Normalized Difference Vegetation index (NDVI) of the two adjacent years, a first improved NDVI NDVI_m1 of the two adjacent years and a second improved NDVI NDVI_m2 of the two adjacent years, a Normalized Burn Ratio (NBR) of the two adjacent years, a Normalized Difference Moisture Index (NDMI) of the two adjacent years, a Normalized Difference Snow Index (NDSI) of the two adjacent years and a NDWI of the two adjacent years according to formulae (9)-(15);

wherein the formulae (9)-(15) are as follows:

$$NDVI = (b4-b3)/(b4+b3) \tag{9}$$

$$NDVI\_m1 = 2.5 \times (b4-b3)/(b4+6 \times b3-7.5 \times b1+1.0) \tag{10}$$

$$NDVI\_m2 = (b4-b3)/(b4+b3+0.5) \times 1.5 \tag{11}$$

$$NBR = (b4-b6)/(b4+b6) \tag{12}$$

$$NDMI = (b4-b5)/(b4+b5) \tag{13}$$

$$NDSI = (b2-b5)/(b2+b5) \tag{14}$$

$$NDWI = (b2-b3)/(b2+b3) \tag{15}$$

wherein b4 indicates the reflectance corresponding to the near-infrared band, b3 indicates the reflectance corresponding to the red band, b2 indicates the reflectance corresponding to the green band, b1 indicates the reflectance corresponding to the blue band, b5 indicates the reflectance corresponding to the first short wave near-infrared band with a wavelength range of 1.57-1.65 (μm), and b6 indicates the reflectance corresponding to the second short wave near-infrared band with a wavelength range of 2.11-2.29 (μm);

conduct principal component analysis on the near-infrared band and blue band of the annual synthetic images of the two adjacent years, and take a principal component image as a feature of landslide detection, and calculate reflectance differences and index differences of each pixel in the six bands of the annual synthetic images in the year y and the year y+1 as well as an average reflectance and a variance of 5.times.5 neighborhood pixels surrounding the pixel in the potential landslide detection result image, as features for exact landslide detection;

build an exact landslide detection model based on the spectral features and textural features and the detection result as well as ground truth landslide pixels obtained by visual interpretation from the annual synthetic images of from the year 2015 to the year 2018; and detect landslide from the potential landslide detection area of the annual synthetic image in the year 2015 based on the built exact landslide detection model, and calculate the omission error and commission error based on the corresponding ground truth landslide image from visual interpretation.

2. The practical method for landslide detection in large space according to claim 1, wherein building the exact landslide detection model comprises: (1) select 5000 landslide sample pixels randomly based on visually interpreted landslide result of the annual synthetic images from the year 2015 to the year 2018, and select 50000 non-landslide sample pixels randomly from the potential landslide area detected from the annual synthetic images from the year 2015 to the year 2018; (2) calculate features of the randomly selected 5000 landslide sample pixels and 50000 non-landslide sample pixels; and (3) build the landslide detection model based on a random forest structure, in which the number of trees of the random forest structure is 500 and a dimension of randomly selected features of each decision tree node of the random forest structure is 31.

3. The practical method for landslide detection in large space according to claim 1, the omission error refers to a percentage of the ground truth landslide pixels which are classified as background object pixels, and the commission error refers to a percentage of classified landslide pixels that are ought to be classified as the background object pixels.

\* \* \* \* \*